Dec. 19, 1950  O. BRUMMER ET AL  2,534,948
INSERT APPLYING JIG FOR MOLDS
Filed Dec. 11, 1948  2 Sheets-Sheet 1

Inventors:
Olin Brummer and
Elmer F. Heimbuch
By A. Truon Jones
Atty.

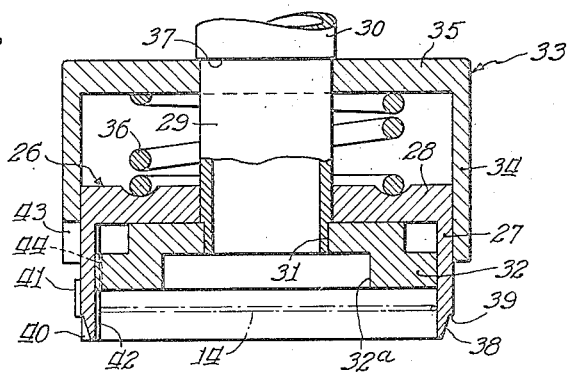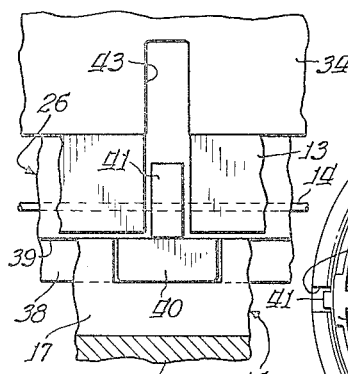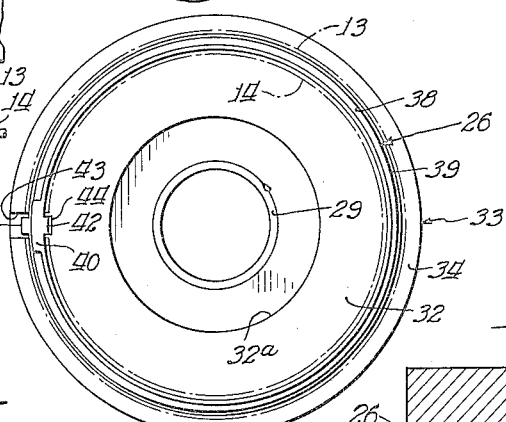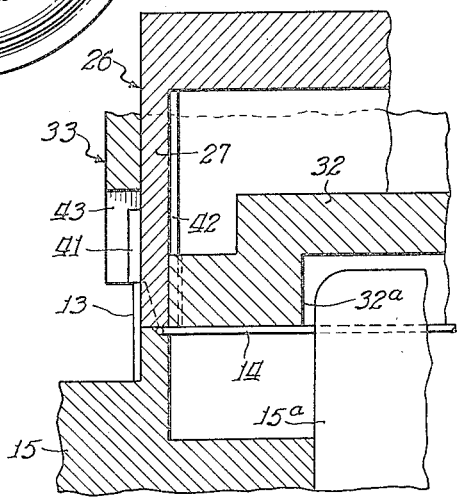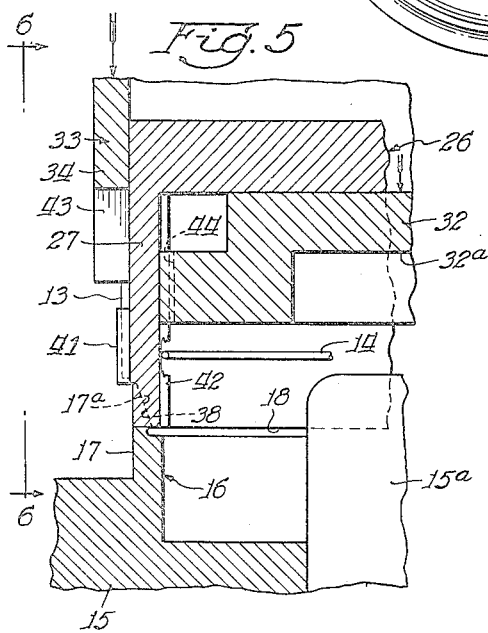

Patented Dec. 19, 1950

2,534,948

UNITED STATES PATENT OFFICE.

2,534,948

INSERT APPLYING JIG FOR MOLDS

Olin Brummer, Crete, and Elmer F. Heimbuch, Chicago Heights, Ill.

Application December 11, 1948, Serial No. 64,778

6 Claims. (Cl. 18—1)

This invention relates to an insert applying jig or the like for plastic molding devices and has particular reference to new and improved means for positioning metal inserts in the mold or die preparatory to the molding operation.

The invention has particular applicability in the molding of annular oil seals such as disclosed and claimed in application of Olin Brummer, S. N. 619,992, filed October 3, 1945, now Patent No. 2,480,116.

The present invention discloses improvements in pertinent subject-matter over our co-pending application S. N. 768,448, filed August 13, 1947.

Among other objects, the present invention aims to provide a jig or such applying device of simplified construction and which may be used with a variety of molds, without necessitating that the operator touch the mold, and hence while the mold is hot, and for applying the insert or inserts with ease and expedition.

These and other objects and advantages will be apparent from the following description, taken with the accompanying drawings, showing an illustrative embodiment of the invention, and in which drawings—

Figure 1 is an axial quarter-sectional view of a mold for which the present device is adapted and showing in section molded therein one of the oil seals above referred to;

Figure 3 is an axial sectional view on the scale of Fig. 2 of a jig embodying the present invention, a handle therefor being shown broken away to save space;

Figure 4 is a bottom plan view of the jig of Fig. 3;

Figure 5 is a fragmentary vertical sectional view, on a larger scale, of the jig of Figs. 3 and 4 associated with the lower mold parts of Fig. 1, for applying metal inserts to the mold;

Fig. 6 is a fragmentary face view of the jig and mold taken on the line 6—6 of Fig. 5; and Figure 7 is a view similar to Fig. 5, showing the jig stripping elements reciprocated to transfer the inserts from the jig to the mold.

Figure 1:
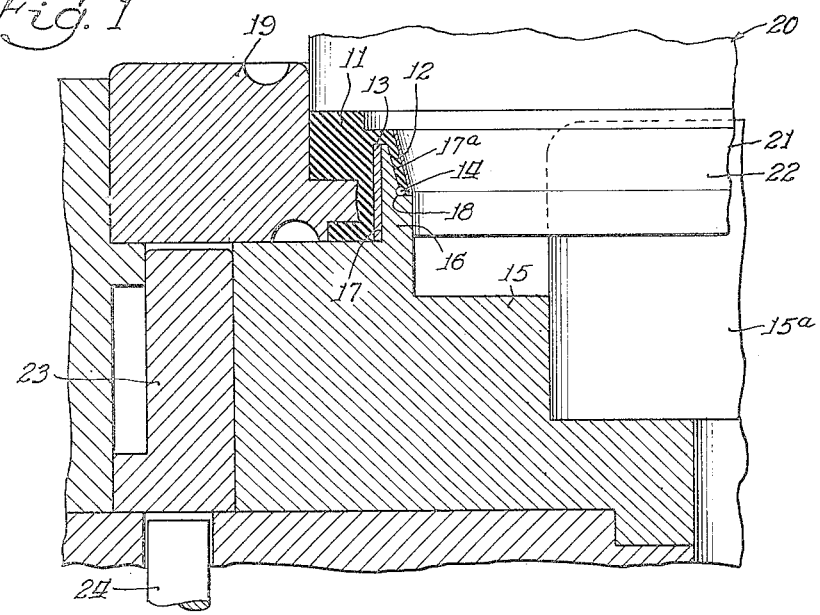

Referring in detail to the illustrative construction shown in the drawings, an oil seal or the like desired to be molded may include an arcuate or annular body 11 comprising a portion of relatively large cross-section and an integral internal lip 12 extending somewhat obliquely from the enlarged body portion, a metal band 13 being molded into the body 11 and a wire 14 into the lip 12. For this purpose, the lower mold part or core 15 may be provided having an annular upstanding flange or ruff 16, the outer face of which 17 is substantially vertical, to receive the band 13, and the inner face of which at its upper end has an inwardly and downwardly tapering surface 17a terminating at its lower end in an undercut or annular groove 18, which locates the wire 14.

Other mold parts may include mold ring 19 and an upper mold part 20 having a ram portion 21 which is received within the ruff 16 and which has an inwardly and downwardly tapering surface 22 spaced from but conforming to the ruff taper 17a which forms the lip 12. After the seal is molded, an ejector ring 23 may be elevated by means of ejector pins 24 to lift the ring 19 and with it the molded seal from the lower mold parts, the upper mold part having now been withdrawn. The lower mold part has a guide hub 15a.

Figure 2:
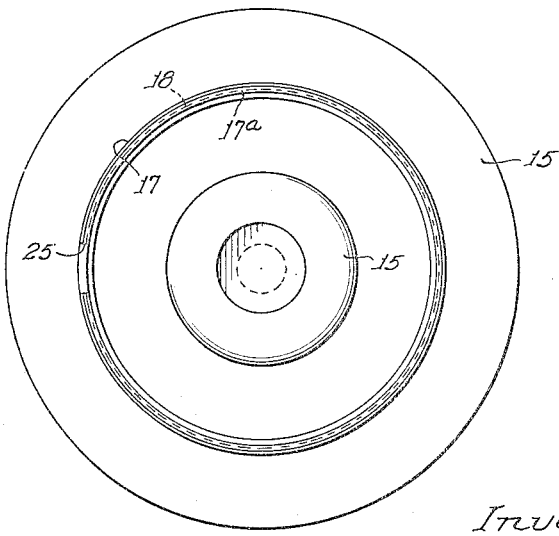
Figure 2 is a plan view of the lower part of the mold core shown in Fig. 1, on a somewhat reduced scale.

In one form of the seal in which a split-annulus seal is desired, the ruff 16 may have a vertical slot 25 (Fig. 2) therein for a purpose presently explained.

The improved jig to which the present invention is directed, and an embodiment of which is shown in Figs. 3 to 7 hereof, will now be described in detail.

As here shown, the jig has a number of cylindrical parts including the head 26 having an axially extending wall 27 and a radially extending wall 28, the head being thus cup-shaped. The wall 28 is perforated centrally so that the head may slide or reciprocate on the shank 29 of a handle 30 for the jig.

Secured to the lower end of the handle shank 29, as by a press fit at 31, is a stripping element part in the form of a cylindrical plunger 32 which has a snug sliding fit within the head 26. Exteriorly of the head is another stripping element part in the form of a stripping sleeve 33 having an axially extending wall 34 and a radially extending wall 35 which is perforated for a press fit of the handle shank 29 therethrough. A fairly heavy compression coil spring 36 is interposed about the shank 29 between the head radially extending wall 28 and the sleeve radially extending wall 35, to urge these elements apart as limited by abutment of the head with the plunger 32 and of the sleeve with a shoulder 37 on the handle 30.

To mate with the core ruff inclined surface 17a, the outer end of the jig head 26 is inwardly tapered as at 38 from the shoulder 39 which is adapted to rest upon the upper edge of the ruff when the jig is in insert applying position. Also in this instance to cooperate with the ruff slot 25, the head 26 has on its exterior a locating lug 40, this lug 40 being on the head tapered surface 38.

It will be seen from Figs. 3, 5 and 6 that the head, in projected position under the influence of the spring 36, extends beyond both the plunger 32 and the sleeve 33, the sleeve terminating farther back on the head than the plunger. Thus the head is adapted to have placed on its exterior the metal band 13 and on its interior the split spring wire 14. Since it may be desired, as already suggested, to split the seal after molding in the vicinity of the slot 25 to form a single-split annulus, it is desirable that both the band 13 and the wire 14 be a split-annulus and that the ends thereof be located centrally of the slot 25, registering with each other and with the slot. For this purpose, aligned with the locating lug 40 on the exterior of the head is a band locating lug 41 preferably narrower than the lug 40 and positioned on the head axially extending wall spaced from the tapered surface 38. Similarly, on the inner periphery of the head, is a locating lug 42 for the ends of the wire 14. To accommodate the band locating lug 41 when the head is reciprocated inwardly, the sleeve 33 has a notch 43 in its outer end, and to accommodate the wire locating lug 42 the plunger 32 has a notch 44. The lug 42 is desirably axially extended to serve also as a guide rib and prevent relative rotation of the head with respect to the plunger and sleeve.

The jig is loaded by placing the band 13 on the exterior of the head in the plane of the locating lug 41 and with this lug between the band ends. The inherent resilience of the band tends to contract it and retains it in position. The band is thus spaced inwardly on the head from the tapered surface 38. The wire 14 is placed on the inner periphery of the head with its ends on opposite sides of the locating rib 42. The natural spring of the wire, which is desirably of piano-wire character, tends to expand it and retains it in position.

After the inserts are located, the jig is placed over the lower mold parts as shown in Fig. 5, aligned and mating with the ruff 16 so that the ruff tapered surface 17a and the head tapered surface 38 are telescoped and conformingly overlapped. At this time the band 13 and wire 14 are not yet in position on the mold ruff, since they are spaced on the head rearwardly of the extreme outer end thereof.

Next, to move the band and wire into position, the jig handle 30 may be pressed upon or the jig stripping elements otherwise reciprocated downwardly with respect to the jig head as shown by the arrows in Fig. 5 and to the position shown in Fig. 7 against the resistance of the spring 36. Upon this movement, the sleeve 33 pushes the band 13 off the head and onto the ruff 16, the band slipping onto the substantially vertical outer wall 17. At the same time the plunger 32, which comes into a plane flush with the outer or distal end of the head, pushes the wire 14 out of the interior of the head 26 and into the plane of the ruff groove 18 whereupon the expansive force of the wire split annulus springs it into the groove. It will be observed that the jig head axially extending wall 27 is advantageously of the same thickness as the core ruff 16 so that when the two are interengaged they form in effect an axially continuous cylindrical wall on which the inserts slide.

The inserts having been located, the jig is lifted leaving the inserts in the mold. The jig plunger 32 is shown recessed as at 32a to receive the mold guide hub 15a. When the jig is lifted, the head 26, under the influence of the spring 36, returns to the position shown in Fig. 3, where it is projected outwardly of the stripper elements.

One advantage of the jig of our present invention over the form shown in our co-pending application S. N. 768,448, is that the present form may be used with a core ruff which is not slotted, simply by omitting the lug 40. Furthermore, in our said co-pending application means are shown for molding a seal in which fillets are formed between the enlarged body portion and the sealing lip and for this purpose the core ruff was there shown slotted at intervals and the jig there shown was similarly finned. Our present jig may be used with a mold so slotted at intervals or it may be used with a mold which as here shown is not so slotted.

Such changes may be made as fall within the scope of the appended claims without departing from the invention.

The invention having been described, what is here claimed is:

1. An insert applying jig for use with a mold element having an upstanding ruff, the outer wall of which is substantially vertical and the inner wall of which includes a downwardly tapered surface inclined from a relatively narrow portion at its top to a relatively wide portion at its base, said ruff being adapted to receive on its substantially vertical wall an insert band and being formed with a horizontal groove at the base of said downwardly tapered surface to receive an insert wire, said jig having a cup-shaped head adapted to be moved axially and downwardly into engagement with said ruff, said head having an axially extending wall having its outer end inwardly tapered to correspond with the tapered surface of said ruff, a plunger snugly slidable within the head, and a stripping sleeve snugly slidable on the exterior of the head, whereby the head may be placed on the ruff and upon downward movement of the plunger and sleeve a band on the outer periphery of the head is moved onto the ruff outer wall and a wire on the inner periphery of the head is moved into the plane of said horizontal groove.

2. An insert applying jig for use with an element having an upstanding ruff, the outer wall of which is substantially vertical and the inner wall of which includes a downwardly tapered surface inclined from a relatively narrow portion at its top to a relatively wide portion at its base, said ruff being adapted to receive on its substantially vertical wall an insert band and being formed with a horizontal groove at the base of said downwardly tapered surface to receive an insert wire, said jig having a head adapted to be moved axially and downwardly into engagement with said ruff, said head having an axially extending wall having its outer end inwardly tapered to correspond with the tapered surface of said ruff, the ruff being slotted and the head having a locating lug received in said slot, a plunger snugly slidable within the head, and a stripping sleeve snugly slidable on the exterior of the head, whereby the head may be placed on the ruff and upon downward movement of the plunger and sleeve a band on the outer periphery of the head is moved onto the ruff outer wall and a wire on the inner periphery of the head is moved into the plane of said horizontal groove.

3. An insert applying jig for use with an element having an upstanding ruff, the outer wall of which is substantially vertical and the inner wall of which includes a downwardly tapered surface inclined from a relatively narrow portion at its top to a relatively wide portion at its base, said ruff being adapted to receive on its substantially vertical wall an insert band and being formed with a horizontal groove at the base of said downwardly tapered surface to receive an insert wire, said jig having a head adapted to be moved axially and downwardly into engagement with said ruff, said head having an axially extending wall having its outer end inwardly tapered to correspond with the tapered surface of said ruff, a plunger snugly slidable within the head, and a stripping sleeve snugly slidable on the exterior of the head, whereby the head may be placed on the ruff and upon downward movement of the plunger and sleeve a band on the outer periphery of the head is moved onto the ruff outer wall and a wire on the inner periphery of the head is moved into the plane of said horizontal groove, the head axially extending wall being of the same thickness and diameter as the ruff, and said last mentioned wall and ruff having interengaging formations limiting engagement of the said axially extending wall and ruff to cause said ruff and wall to jointly provide continuous surfaces upon which the band and wire may slide from the head to the ruff.

4. An insert applying jig, comprising, an inverted cup-shape head for holding on its outer periphery a spring band and having an inner periphery of uniform diameter for holding on said inner periphery a spring wire, said head being tapered from its outer periphery toward its inner periphery at its lower end, a stripping sleeve telescoping with said head on the exterior of the head, a plunger snugly fitting within the head, said head being relatively reciprocable with respect to the sleeve and plunger, said plunger providing a stripping element for discharging the wire from the head through its lower end and said sleeve providing a stripping element for pushing the band off the head, and a spring retracting the plunger within the head and the sleeve to a position spaced from the lower end of the head.

5. The structure of claim 4 wherein the head carries registering locating lugs on its inner and outer periphery for locating the ends of a split-annulus spring wire and a split-annulus spring band, and one of said lugs serves as a guide-rib locking the head against rotation with respect to the sleeve and plunger while permitting relative reciprocation thereof.

6. An insert applying jig for use with a mold element having an upstanding ruff, the outer wall of which is substantially vertical and the inner wall of which includes a downwardly tapered surface inclined from a relatively narrow portion at its top to a relatively wide portion at its base and being formed with a horizontal groove at the base of said downwardly tapered surface to receive an insert wire, said jig having a hollow head adapted to be moved axially and downwardly into engagement with said ruff short of said groove, said head having an axially extending wall having its outer end inwardly tapered to correspond with the tapered surface of said ruff, the head having a shoulder limiting engagement with the ruff, locating lugs on the head inner surface and tapered surface, the ruff being slotted to receive said lug on the head tapered surface and said lugs being radially aligned, a plunger snugly slidable within the head, said plunger being notched to receive the lug on the head inner surface, whereby the head may be placed on the ruff and upon downward movement of the plunger a split-annulus wire on the inner periphery of the head may be moved into the plane of said horizontal groove, and said lug on the head inner surface may be located between the ends of the wire and the ends of the wire aligned with the lug on said head tapered surface and with the slot in the ruff.

OLIN BRUMMER.
ELMER F. HEIMBUCH.

REFERENCES CITED

The following references are of record in the file of this patent:

UNITED STATES PATENTS

| Number | Name | Date |
|---|---|---|
| 1,288,111 | Milne | Dec. 17, 1918 |
| 2,251,135 | Iknayan et al. | July 29, 1941 |
| 2,422,549 | Hogin | June 17, 1947 |
| 2,451,912 | Bradley | Oct. 19, 1948 |